(12) United States Patent
Elgarhy

(10) Patent No.: US 9,796,871 B2
(45) Date of Patent: Oct. 24, 2017

(54) ANTI EFFLORESCENCE COMPOSITION

(71) Applicant: TRI-TEXCO INC., St-Eustache (CA)

(72) Inventor: Yassin M. Elgarhy, Laval (CA)

(73) Assignee: TRI-TEXCO INC., St-Eustache, QC (CA)

( * ) Notice: Subject to any disclaimer, the term of this patent is extended or adjusted under 35 U.S.C. 154(b) by 0 days.

(21) Appl. No.: 14/941,808

(22) Filed: Nov. 16, 2015

(65) Prior Publication Data

US 2016/0137870 A1    May 19, 2016

Related U.S. Application Data

(60) Provisional application No. 62/080,583, filed on Nov. 17, 2014.

(51) Int. Cl.

| C09D 129/04 | (2006.01) |
| C09D 133/00 | (2006.01) |
| C04B 41/48 | (2006.01) |
| C04B 41/53 | (2006.01) |
| C04B 41/00 | (2006.01) |
| C04B 41/63 | (2006.01) |
| C09D 133/02 | (2006.01) |
| C04B 111/21 | (2006.01) |

(52) U.S. Cl.
CPC .......... *C09D 133/00* (2013.01); *C04B 41/009* (2013.01); *C04B 41/483* (2013.01); *C04B 41/4869* (2013.01); *C04B 41/63* (2013.01); *C09D 129/04* (2013.01); *C09D 133/02* (2013.01); *C04B 2111/21* (2013.01)

(58) Field of Classification Search
CPC ..... C11D 3/042; C11D 3/3746; C11D 3/3753; C09D 129/04; C09D 133/00; C04B 41/48; C04B 41/53
See application file for complete search history.

(56) References Cited

U.S. PATENT DOCUMENTS

| 4,585,820 A * | 4/1986 | Defago ................ D06P 1/5257 |
| | | 524/232 |
| 2011/0021403 A1 * | 1/2011 | Miralles ................... C02F 5/14 |
| | | 510/219 |
| 2013/0143023 A1 * | 6/2013 | Herold .................... C04B 28/10 |
| | | 428/220 |

* cited by examiner

*Primary Examiner* — Brian P Mruk
(74) *Attorney, Agent, or Firm* — Norton Rose Fulbright

(57) ABSTRACT

The present description relates to an anti-efflorescence water based composition that eliminates the efflorescence that occurs on new pavers, stones, concrete bricks or concrete furniture because of high humidity comprising a homo polymer solution of acrylic, an hydrolyzed polyvinyl alcohol and/or a combination thereof.

15 Claims, 2 Drawing Sheets

A

B ically, a method to reduce efflorescence happening on
ANTI EFFLORESCENCE COMPOSITION

CROSS-REFERENCE TO RELATED APPLICATIONS

The present application claims benefit of U.S. Provisional Application No. 62/080,583, filed Nov. 17, 2014, which is hereby incorporated herein by reference in its entirety.

TECHNICAL FIELD

The present description relates to an anti-efflorescence water based composition that eliminates the efflorescence from pavers, concrete bricks, stones or concrete furniture.

BACKGROUND ART

It is common to see large and unsightly blotches or patches of a white crystalline formation on the face of brick walls. These patches are formed when water moving through a wall or other structure, or water being driven out as a result of the heat of hydration as cement stone is being formed, brings salts to the surface that are not commonly bound as part of the cement stone. As the water evaporates, it leaves the salt behind, which forms a white, fluffy deposit. The resulting white deposits are referred to as "efflorescence".

Efflorescence is a whitish deposit on the surface of material, having as its main components $CaCO_3$, $Na_2CO_3$, $K_2CO_3$, or $CaSO_4$ for example. The formation of efflorescence depends on the presence of water soluble salts (especially $Ca^{2+}$), the presence of water and the presence of channels along which water can migrate to the surface of the material. During hydration of cement for example, water soluble chemicals such as $Ca(OH)_2$ are formed. During drying, these water soluble chemicals migrate with water to the surface of the material and then react with the $CO_2$ or $SO_2$ in the air to form the respective carbonate or sulphate salt. More specifically, sulfates and carbonates being drawn from the material by the moisture leave a crystalline deposit on the surface of the material, after the evaporation of the moisture. While formed in all seasons, efflorescence is an especially serious problem in winter because of the slower hydration and the lower water solubility of chemicals at colder temperatures.

Surface efflorescence causes aesthetic detriment that can monetarily devalue afflicted masonry. Particularly, in case of dark colored mortar surfaces for example, the formation of bright spots causes an irregular pattern of high contrast. When efflorescence occurs underneath a water-repellent coating, salt crystals expand as they grow and can cause extreme pressures that can result in the spalling and flaking of a building material. This process can ultimately compromise the structural integrity of the building material.

Diluted acids and other strong active agents are used commonly to remove the efflorescence from bricks however the white patches soon reappear.

Hydrophobic additives have also been incorporated into inorganic building material in an attempt to reduce moisture penetration and reduce efflorescence. However, the addition of such additives is self-limiting since water is needed for example to hydrate the cement in order to cure the concrete. Too much hydrophobic material in the wet concrete inhibits this hydration. Furthermore, when the degree of hydrophobicity of concrete increases, the degree of suction and bonding decreases. It becomes very difficult and time consuming adjusting the amount of hydrophobic additives that is needed without being detrimental to the concrete essential properties.

Hydrophobic films have also been used to ineffectively form a physical barrier that block the passage of air, water, and water vapor on the surface of bricks or blocks for example in order to reduce efflorescence.

Accordingly, there is thus a need to be provided with a composition or method to reduce efflorescence happening on new pavers, concrete bricks, stones or concrete furniture.

SUMMARY

In accordance with the present description there is now provided an anti-efflorescence water based composition comprising from 1% to 60% by weight of at least one of a homo polymer solution of acrylic, a hydrolysed polyvinyl alcohol (PVOH) or a combination thereof, and water.

In accordance with another embodiment, it is also provided the use of the composition described herein for removing or preventing efflorescence from pavers, concrete bricks, stones or concrete furniture.

In accordance with a further embodiment, it is also provided a method of preventing or removing efflorescence from pavers, concrete bricks, stones or concrete furniture comprising the step of applying the composition as described herein on the surface of said pavers, concrete bricks, stones or concrete furniture.

In a particular embodiment, the composition described herein comprises at least one acrylic polymer.

In another embodiment, the homo polymer has molecular weight between 1000 and 500000.

In accordance with another embodiment, the homo polymer has molecular weight between 1000 and 100000.

In an embodiment, the homo polymer has molecular weight between 4000 and 30000.

In another embodiment, the PVOH has a molecular weight between 10000 to 150000.

In a further embodiment, the PVOH has a molecular weight between 100000 and 130000.

In another embodiment, the composition described herein further comprises one of phosphoric acid, nitric acid, sulfamic acid and urea/hydrochloric acid.

In another embodiment, the composition described herein further comprises 0.1% of one of phosphoric acid, nitric acid, sulfamic acid and urea/hydrochloric acid.

In an embodiment, the pH of said composition is neutralized up to pH 13.

In a further embodiment, the pH of said composition has a pH between 2 and 10.

In an additional embodiment, the pH of said composition is neutralized at a pH between 4 and 6.

In another embodiment, the pH of the composition is neutralized by adding an alkali.

In a further embodiment, the alkali is at least one of caustic soda, potassium hydroxide and ammonium hydroxide or other alkali.

In an additional embodiment, the composition comprises at least 0.1% of the homo polymer solution of acrylic, or the polyvinyl alcohol or the combination thereof.

In an embodiment, the composition comprises 1 to 60% of the homo polymer solution of acrylic, or the polyvinyl alcohol or the combination thereof.

In another embodiment, the composition comprises 15 to 30% of the homo polymer solution of acrylic, the polyvinyl alcohol or the combination thereof.

In accordance with another embodiment, the composition comprises 20% of the homo polymer solution of acrylic, the polyvinyl alcohol or the combination thereof.

In accordance to another embodiment, the composition described herein is for removing or preventing efflorescence from pavers, concrete bricks, stones or concrete furniture.

DETAILED DESCRIPTION

It is provided an anti-efflorescence water based composition that eliminates the efflorescence that occurs on new pavers, stones, concrete bricks or concrete furniture because of high humidity happening during the storage or whenever the above materials become wet for any reason.

The composition described herein comprises from 1% to 60% by weight of at least one a homo polymer solution of acrylic, or hydrolysed polyvinyl alcohol or a combination thereof, and water.

Figure 1:
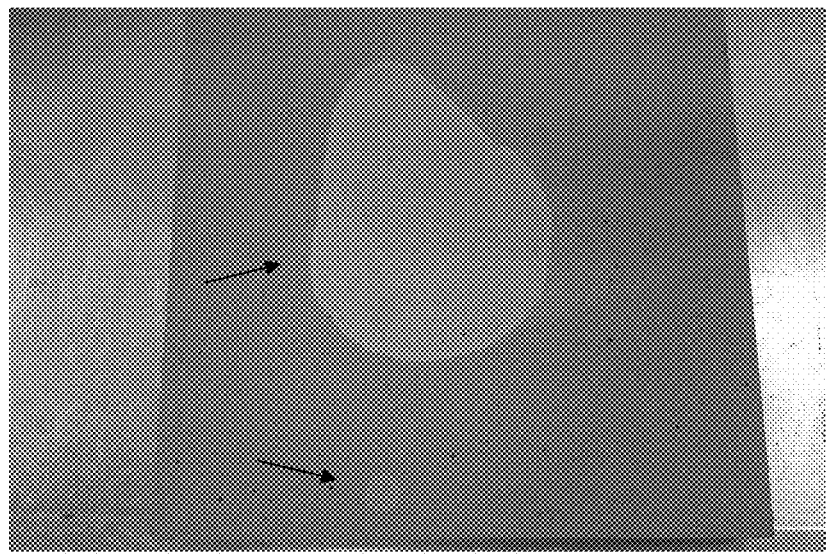
FIG. 1 shows photos of an untreated (A) and treated concrete paver, wherein efflorescence is clearly seen on the untreated paver (arrows in A) versus the treated paver (B) with the composition described herein comprising sodium polyacrylate after immersing them in mineral water for 3 hours.
Figure 1:
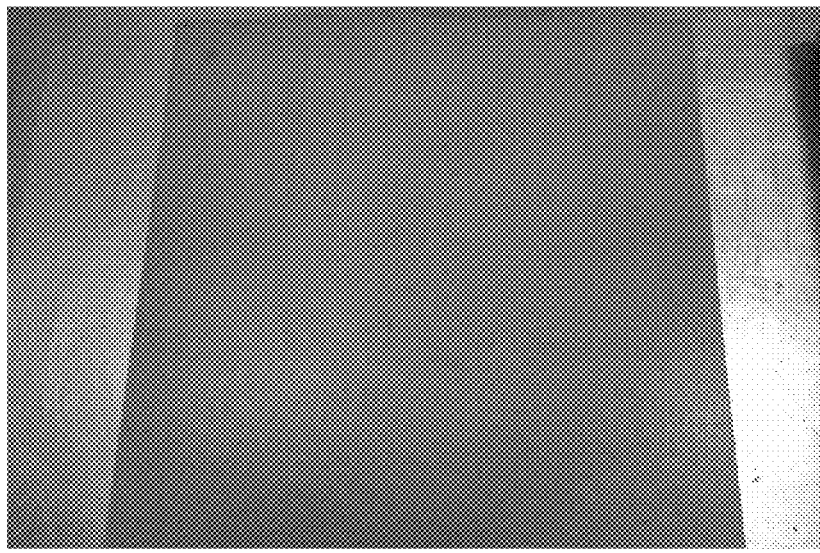

The composition encompassed herein can be used to prevent or remove efflorescence that has already occurred. As clearly evidenced in FIG. 1, no sign of efflorescence was seen on a treated concrete paver with the composition described herein containing an homo polymer solution of acrylic compared to an untreated paver, wherein efflorescence is clearly seen (white spots, see arrows in FIG. 1A) after immersing them in mineral water for 3 hours.

The composition described herein is a water based product that reduces or eliminates efflorescence. The composition comprises a homo polymer containing from 1% to 60% by weight of a residual of at least one acrylic monomer, the molecular weight of this homo polymer being between, between 1000 to 500000, and more preferably between 4 000-100000.

The composition described herein can also comprise hydrolyzed polyvinyl alcohol (PVOH). The composition can comprise for example 14% of PVOH in water at a pH of around 2.

Figure 2:
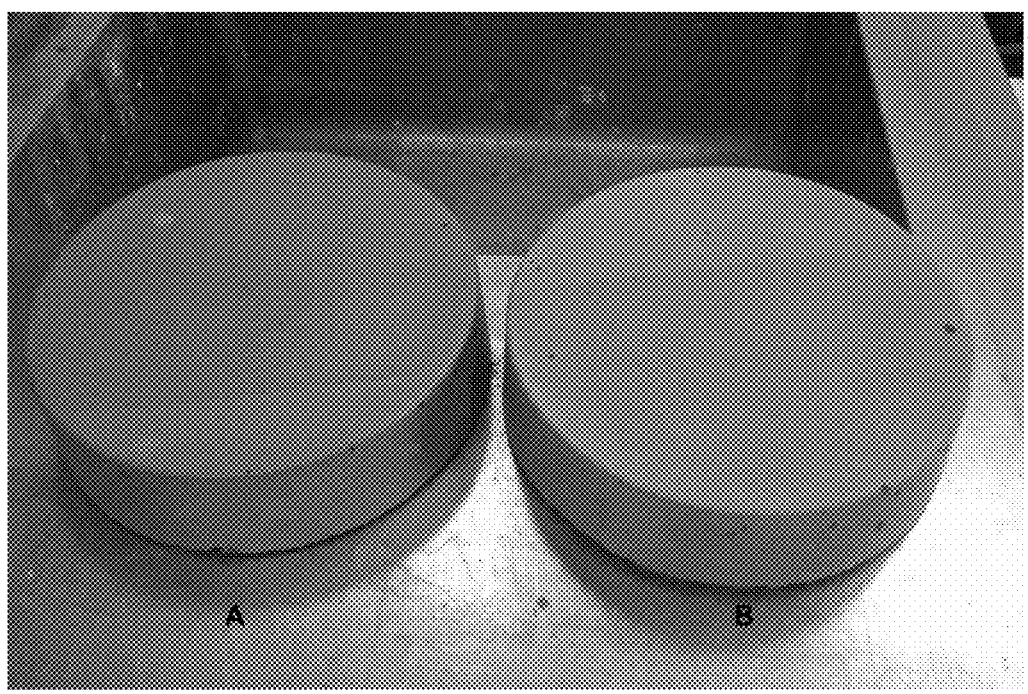
FIG. 2 shows photos of treated concrete pavers with (A) 1.5% PVOH+1.5% sodium polyacrylate and (B) 1.5% PVOH alone wherein efflorescence was blocked.

In an embodiment, the composition comprises between 5 to 60% of the polymer or PVOH. The hydrolyzed polyvinyl alcohol can be applied in combination or instead of the acrylic polymer. As seen in FIG. 2, PVOH used alone (FIG. 2B) is more effective that a combination of PVOH+sodium polyacrylate (FIG. 2A). Still, the combination of PVOH+ sodium polyacrylate allowed removing and preventing efflorescence to appear almost entirely.

Encompassed herein a hydrolyzed and partially hydrolyzed PVOH, with low molecular weight to high molecular weight. Molecular weight of PVOH encompassed is from 10000 to 150000, preferably between 100000 and 130000.

In another embodiment, the composition can be in acid form or neutralized at pH from 2 to 11, preferably from 4-7.

The concentration of the finished product is ideally adjusted to contain 14-20% of active product.

The composition described herein can also comprise phosphoric acid, nitric acid, sulfamic acid or urea/hydrolic acid. The added acid will vary depending on the surface to be treated. For example in case of pavers, nitric acid is not recommended because it could react with iron content in pavers otherwise all the other acids can be used.

The composition described herein can be used to remove efflorescence occurred already on the surface of pavers, stones, concrete, by covering the pavers with the composition as described herein, comprising for example 0.1% to 5% polymer in a water solution, 0.1 to 5% of polyvinyl alcohol or a combination thereof.

To prevent efflorescence from occurring, the composition as described hereinabove, comprising for example 2.0% polymer or PVOH or a combination thereof is applied on the surface of the pavers or concrete to cover it completely then let to dry. This will prevent efflorescence from occurring because of the extra humidity or water.

The composition of the acrylic copolymer as described herein was made for example by mixing de-ionized water; sodium metabisulfite; ammonium persulfate and glacial acrylic acid 99.5%.

Alternatively, a mixture of de-ionized water; sodium metabisulfite; sodium persulfate; and glacial acrylic acid was also made.

Both mixtures can be reacted at 75 to 120° C. for few hours. After the reaction and obtaining the homo polymer of acrylic acid, the product can be semi neutralized or completely neutralized by caustic soda potassium hydroxide, ammonium hydroxide or other alkalies.

While the invention has been described in connection with specific embodiments thereof, it will be understood that it is capable of further modifications and this application is intended to cover any variations, uses, or adaptations of the invention following, including such departures from the present disclosure as come within known or customary practice within the art to which the invention pertains and as may be applied to the essential features hereinbefore set forth, and as follows in the scope of the appended claims.

What is claimed is:

1. A method of preventing or removing efflorescence from pavers, concrete bricks, stones or concrete furniture comprising the step of applying a composition comprising from 0.1% to 60% by weight of a hydrolysed polyvinyl alcohol (PVOH) or a combination of a homo polymer solution of acrylic and the PVOH, at least one of phosphoric acid, nitric acid, sulfamic acid and urea/hydrochloric acid and water, on the surface of said pavers, concrete bricks, stones or concrete furniture.

2. The method of claim 1, comprising at least one acrylic polymer.

3. The method of claim 1, wherein the homo polymer has molecular weight between 1000 and 500000.

4. The method of claim 1, wherein the homo polymer has molecular weight between 1000 and 100000.

5. The method of claim 1, wherein the homo polymer has molecular weight between 4000 and 30000.

6. The method of claim 1, wherein the PVOH has a molecular weight between 10000 to 150000.

7. The method of claim 1, wherein PVOH has a molecular weight between 100000 and 130000.

8. The method of claim 1, further comprising 0.1% of at least one of phosphoric acid, nitric acid, sulfamic acid and urea/hydrochloric acid.

9. The method of claim 1, wherein the pH of said composition is neutralized up to pH 13.

10. The method of claim 9, wherein the pH of said composition has a pH between 2 and 10.

11. The method of claim 8, wherein the pH of said composition is neutralized at a pH between 4 and 6.

12. The method of claim 8, wherein the pH of the composition is neutralized by adding an alkali.

13. The method of claim 12, wherein the alkali is at least one of caustic soda, potassium hydroxide and ammonium hydroxide or other alkali.

14. The method of claim 1, wherein the composition comprises 15 to 30% of the PVOH or the combination of the homo polymer solution of acrylic and the PVOH.

15. The method of claim 1, wherein the composition comprises 20% of the PVOH or the combination of the homo polymer solution of acrylic and the PVOH.

* * * * *